United States Patent
Piersol et al.

(10) Patent No.: US 7,970,169 B2
(45) Date of Patent: Jun. 28, 2011

(54) SECURE STAMPING OF MULTIMEDIA DOCUMENT COLLECTIONS

(75) Inventors: Kurt Piersol, Campbell, CA (US); Stephen Savitzky, San Jose, CA (US)

(73) Assignee: Ricoh Co., Ltd., Tokyo (JP)

( * ) Notice: Subject to any disclaimer, the term of this patent is extended or adjusted under 35 U.S.C. 154(b) by 1186 days.

(21) Appl. No.: 11/026,621

(22) Filed: Dec. 30, 2004

(65) Prior Publication Data

US 2006/0147083 A1 Jul. 6, 2006

(51) Int. Cl.
*G06K 9/00* (2006.01)
(52) U.S. Cl. ........................................ 382/101; 382/102
(58) Field of Classification Search .................. 382/100, 382/306, 317; 358/3.28; 707/E17.008
See application file for complete search history.

(56) References Cited

U.S. PATENT DOCUMENTS

| | | | |
|---|---|---|---|
| 6,522,770 B1 * | 2/2003 | Seder et al. | 382/100 |
| 2002/0168090 A1 * | 11/2002 | Bruce et al. | 382/101 |
| 2004/0114779 A1 * | 6/2004 | Blazey | 382/100 |
| 2004/0213482 A1 * | 10/2004 | Silverbrook | 382/312 |
| 2006/0133670 A1 * | 6/2006 | Barrus et al. | 382/173 |

* cited by examiner

*Primary Examiner* — Brian Q Le
(74) *Attorney, Agent, or Firm* — Blakely, Sokoloff, Taylor & Zafman LLP (57) ABSTRACT

Secure stamping of multimedia document collections is disclosed. In one embodiment, the method comprises adding an image to a collection of media objects, and producing a visual representation of the collection that includes the image, where the visual representation has an identifier to identify the collection and graphical content representing the media objects.

45 Claims, 8 Drawing Sheets

FIG. 1

Select Stamp

☐ FYI    ☐ RECEIVED

☐ PROPRIETARY    ☐ URGENT!

☑ COMPLETE    ☐ FAXED

☐ REC'D    ☐ CONFIDENTIAL

☐ POSTED    ☐ $ PAID $

Indicate desired placement: *Watermark*

SECURE STAMPING OF MULTIMEDIA DOCUMENT COLLECTIONS

FIELD OF THE INVENTION

The present invention relates generally to the field of document management and more specifically to securing collections of multimedia documents.

BACKGROUND OF THE INVENTION

Despite the ideal of a paperless environment that the popularization of computers had promised, paper continues to dominate the office landscape. Ironically, the computer itself has been a major contributing source of paper proliferation. The computer simplifies the task of document composition, and thus has enabled even greater numbers of publishers. The computer promotes individual expression through the use of graphics tools, image capture devices, image enhancement tools, and so on, in addition to traditional text editing. Oftentimes, documents must be shared among colleagues, thus generating even more paper.

Despite advances in technology, suitable personal output devices as a practical substitute for paper remain to be developed. Personal data assistants (PDAs such as Palm Pilot® by 3Comm, Inc., and similar hand held devices) typically do not have the storage capacity, the processing capacity, the display capacity, or the connectivity to effectively present documents to the user in a convenient and useful manner. Unlike paper, devices such as PDAs are not universal. While many document formats exist for representing information, not all devices have all the software needed to read all documents. Worse yet, PDA documents typically use formats that are not readily available on a desktop or laptop PC. Usually, documents have to be converted between formats. Thus, paper remains the simplest way in many situations for storing information (e.g., record keeping), distributing information, and controlling access to information.

Paper has been an integral component of civilization for thousands of years. Its replacement is not likely to occur soon, if ever, despite the ubiquity of computer-based technology. Electronic information almost invariably is reduced, at least in part, to paper. Generally, there is a need to use computers to more effectively share information and to provide access to that information. In addition, the information should not be limited to any particular mode of expression, allowing for all forms of communication media.

A cover sheet, as used in a TouchVerse™ system of Ricoh Innovations of Menlo Park, Calif., is typically a paper document that provides access to and management of a collection of arbitrary media files. Each cover sheet typically contains a machine-readable identifier for the collection as well as a graphic or image representing the contents of the collection. When a modification occurs to the collection, the graphic that appears on the cover sheet is changed. However, to reflect those changes, a new paper cover sheet is printed.

Collections of paper documents are used for many purposes. Many people keep folders of documents on their desks or in their file system that are related to a particular task or to a particular person.

People have used stamps on documents for many years for a variety of purposes. For example, when people approve certain documents, the document may receive an "approved" stamp to indicate its approval. However, such stamping is always susceptible to forgery. That is, it was often difficult from looking at a stamped document to determine whether the document is authentic since any individual or entity could have applied the stamp. One prior art solution to this problem is to add a digital watermark to the document. The digital watermark is difficult to reproduce, and therefore, provides a level of security to the document since only the party applying the watermark is likely able to have it placed on the document. Another prior art solution is to attach digital signatures to documents. However, neither the digital watermark nor the digital signature is a guarantee that the document to which they are applied is authentic. That is, the digital watermark and the digital signature are not entangled with the information that appears on the document. Therefore, the presence alone of the digital watermark or the digital signature cannot be used to provide a high level of authenticity.

SUMMARY OF THE INVENTION

Secure stamping of multimedia document collections is disclosed. In one embodiment, the method comprises adding an image to a collection of media objects, and producing a visual representation of the collection that includes the image, where the visual representation has an identifier to identify the collection and graphical content representing the media objects.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for secure stamping of multimedia document collections is described. In one embodiment, the method comprises adding a stamp image (e.g., a watermark, etc.) to a collection of media objects, and producing a visual representation of the collection (e.g., a sheet of paper or other suitable media) that includes the stamp image. In one embodiment, the visual representation is a collection coversheet that has an identifier to identify the collection and graphical content representing the media objects. In such a case, producing the visual representation typically comprises printing a sheet of paper.

The cover sheet provides access to and management of a collection of arbitrary media objects through the use of an identifier (e.g., a machine-readable identifier, such as, for example, a barcode). Media objects may include scanned documents, images, audio files, text notes, annotations (drawing marks), web pages, and office documents like spreadsheets and presentations. The media objects may be represented by a set of thumbnails on the cover sheet. Other representations may be used.

The terms "paper," "paper medium," or "sheet" as used in this application are intended to refer to any tangible medium on which information can be formed whether by a printing process, written, drawn, imprinted, embossed, etc. For purposes of this invention, the term "printing" is intended to encompass all manner of forming images on an image-bearing medium whether by optical, mechanical, thermal, or electrical methods, or combinations thereof.

Collections in this specification have a specific meaning. A "collection" can include one or more groups of electronic documents or media which might include digital images, audio recordings, scanned images from pages of a document, files like Microsoft Word documents or Microsoft Excel spreadsheets. Collections can also contain pointers to other collections. Collections can include user-provided markings, annotations, and such. Collections can also include metadata representing related information such as date of creation, modification date, access permissions, and so on.

A collection is stored on a collection server and has a specific address or identifier, similar to a URL or uniform resource locator, which identifier is unique and provides a pointer to the collection. A collection has a coversheet that displays a representation of the contents of the collection with an overview image showing thumbnails that represent all of the documents in the collection. More details about collections will be described in another part of this specification.

In one embodiment, the stamp image that is added to the collection is entangled with the collection. In one embodiment, the stamp image is entangled with the document being stamped and a private key. The stamp image may be entangled with the collection by having the stamp image include information extracted from the collection, e.g., using a hash of the collection's content, although other ways of entanglement may be used. In such a case, the stamp image provides an encrypted reference back (e.g., a digital signature) to the original image to which it is added. The stamp image may include a watermark. The image allows the collection of media objects (e.g., documents) to be verified without accessing the collection of documents. Thus, the techniques described herein may be used for collection management.

In one embodiment, the stamp image may be used to verify the authenticity of the visual representation of a collection of media objects (e.g., documents). This may be performed by scanning a sheet having the visual representation of the collection and verifying the authenticity of the visual representation based on a comparison of information incorporated into the stamp image and information from scanned data related to the visual representation. This will be described in more detail below.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
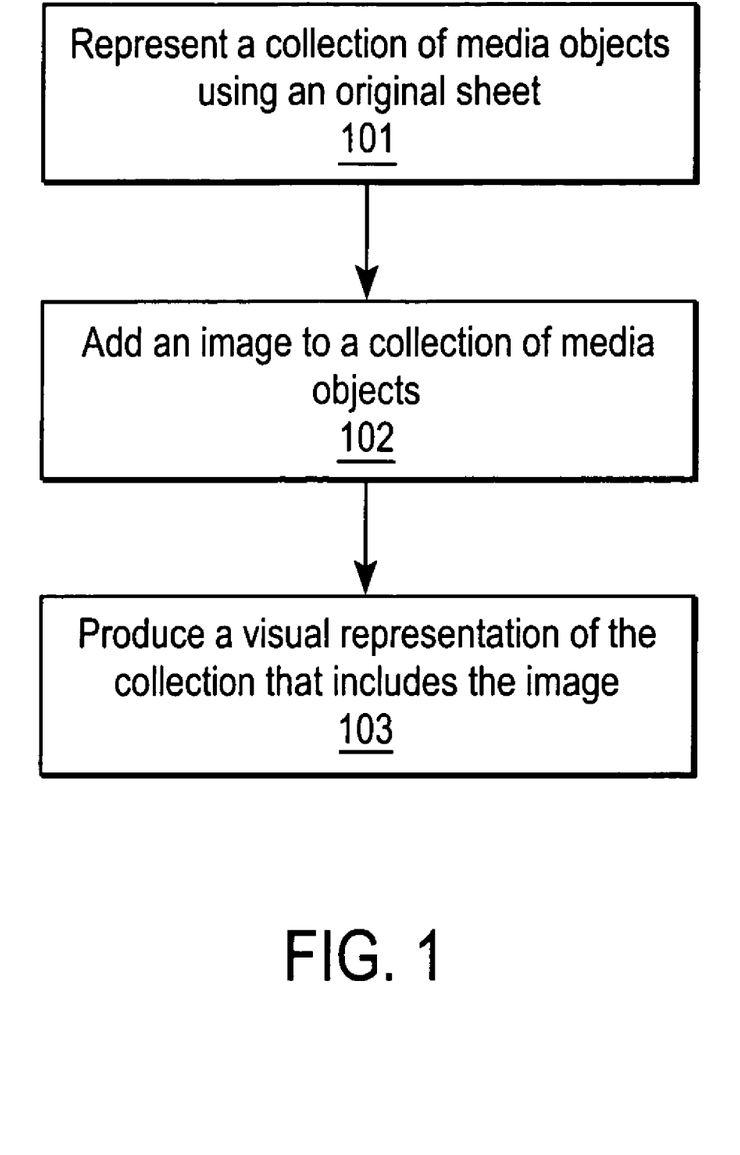
FIG. 1 is a flow diagram of a process for securing a collection of media objects.

FIG. 1 is a flow diagram of a process for securing a collection of media objects. The process is performed by processing logic that may comprise hardware (e.g., circuitry, dedicated logic, etc.), software (such as is run on a general purpose computer system or a dedicated machine), or a combination of both.

Referring to FIG. 1, the process begins by processing logic representing a collection of media objects using an original sheet (processing block 101). The sheet has an identifier and a graphical content representing the media objects. In one embodiment, the identifier comprises a machine-readable identifier (e.g., barcode). Alternatively, the identifier may comprise a radio-frequency identifier (e.g., RFID).

Next, processing logic adds a stamp image to a collection of media objects (processing block 102). In one embodiment, the stamp image is entangled with the collection in that the stamp image is a graphic containing information relating to media objects. The information may comprise a word. In one embodiment, the stamp image may be visually related to the collection and is readable by an automated mechanism. In one embodiment, the stamp image is added to the visual representation in a known location.

After the stamp image has been added to the collection of media objects, processing logic produces a visual representation of the collection that includes the image (processing block 103). In one embodiment, the visual representation comprises a sheet of paper (e.g., a collection coversheet) printed with the identifier to identify the collection and graphical content representing the media objects.

In one embodiment, verification information is integrated into the stamp image. In one embodiment, the verification information includes one or more of a group consisting of an indication of the individual that caused the stamp image to be inserted into the collection, a time indication indicating the time the stamp image was inserted into the collection, and an identifier of collection data to which the stamp image is to be added. In one embodiment, bits of the image are linked to authentication information on the visual representation to enable authentication of the visual representation. For example, the combined information noted above might be encrypted using public key encryption. The individual's private key would be used to encrypt the data, and then the individual's public key and encrypted data would be printed as plain text on the bottom edge on the image. This would allow verification by any reader, but would guarantee the identity of the creator of the image.

Thus, in one embodiment, processing logic prepares an image that is entangled with a collection, adds the image to the collection, and generates a sheet displaying an overview of the collection and the image.

Note that the visual representation may be verified for authenticity by optically scanning the image and using the information in the stamp image to determine whether the visual representation is related to the stamp image. More specifically, the stamp image is displayed on a sheet in a format suitable for optical or electronic verification. This will be described in further detail below.

Figure 2:
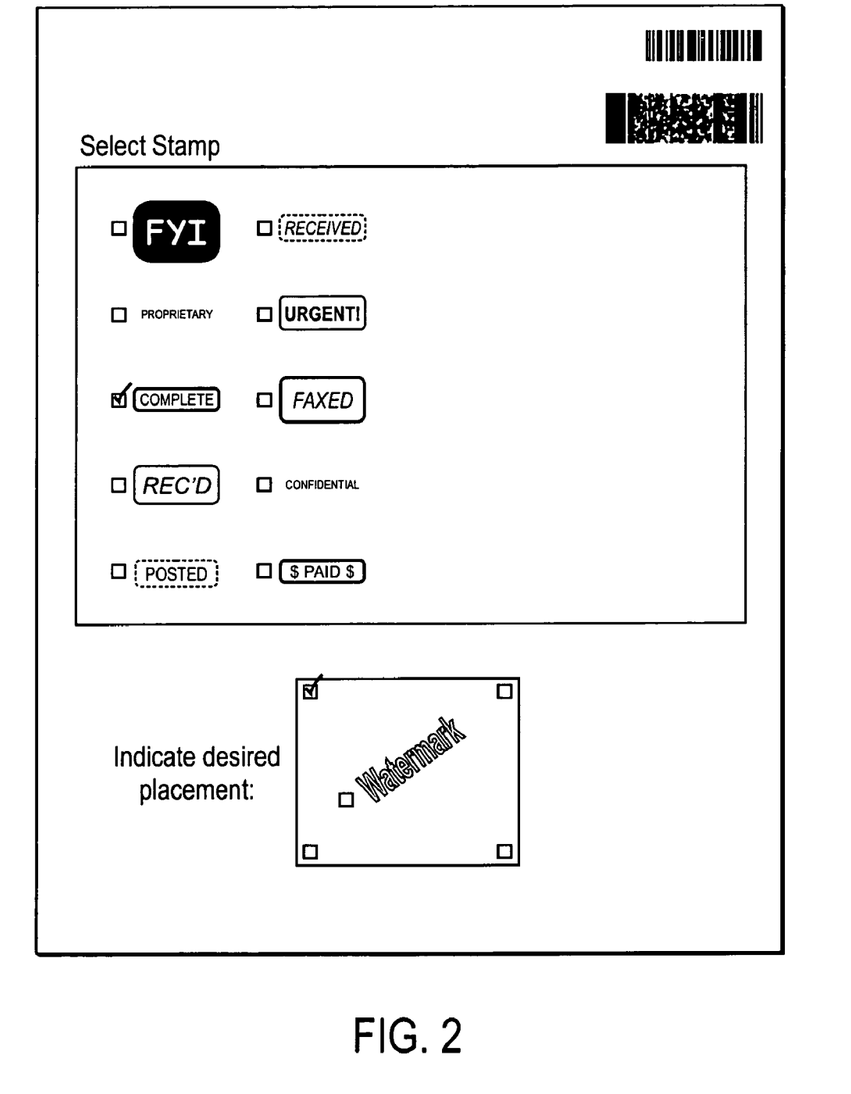
FIG. 2 is an example of a sheet that includes a stamp.

FIG. 2 is an example of a sheet that includes a stamp. Referring to FIG. 2, the sheet is a collection coversheet with an image.

Image Creation

Figure 3:
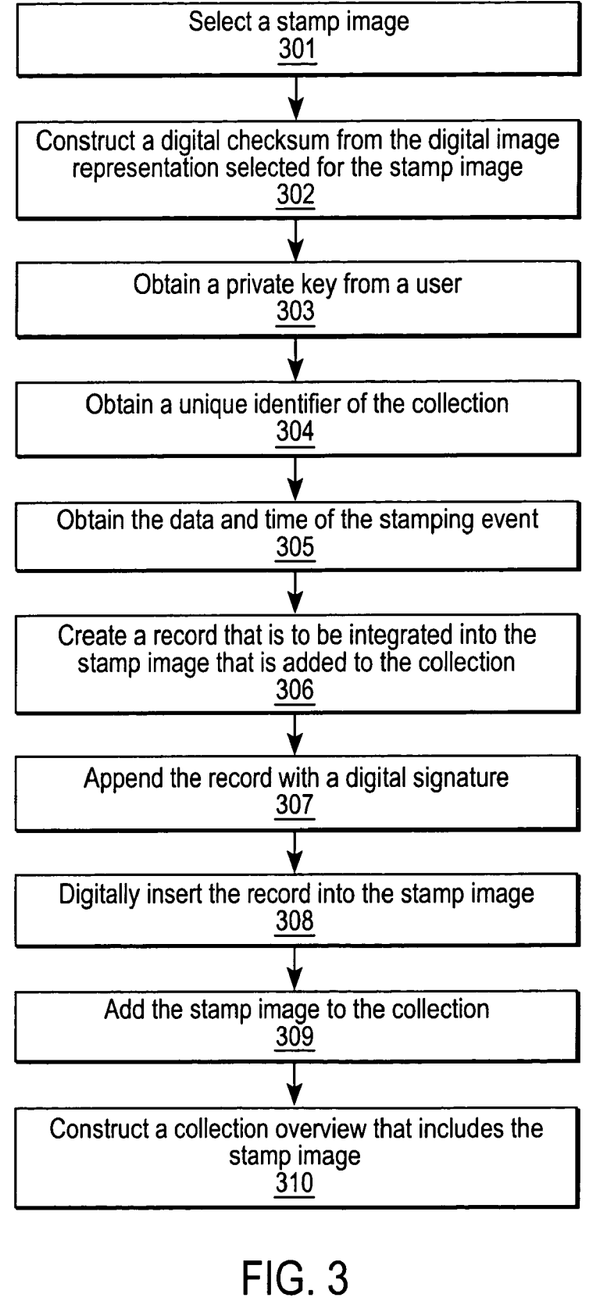
FIG. 3 illustrates one embodiment of a process for creating the stamp image and adding the stamp image to the collection of media objects.

FIG. 3 illustrates one embodiment of a process for creating the stamp image and adding the stamp image to the collection of media objects. The process is performed by processing logic that may comprise hardware (e.g., circuitry, dedicated logic, etc.), software (such as is run on a general purpose computer system or a dedicated machine), or a combination of both.

Referring to FIG. 3, the process begins by processing logic selecting a stamp image (processing block 301). In one embodiment, the image may be a word or other identifiable mark. The image may include a visual representation of a collection to which the stamp image is to be added. The stamp image may be chosen by the user and/or selected by looking at a display using a number of menus and/or cursor control devices.

Once selected, processing logic constructs a digital checksum from the digital image representation selected for the stamp image (processing block 302). In one embodiment, processing logic performs this by applying an MD5 or other hash to the original of the selected stamp image. By doing so, this may be used to check whether there is identity equivalence between modified stamp images at a time in the future. In an alternative embodiment, the hash may be further encrypted by including the date and/or time to the hash and applying the hash again. In this way, the hash can be verified by anyone with access to the original image, but cannot be forged without the bits of the original image. More specifically, the images that are generated for insertion may be authenticated electronically. Without the original image bits A, which are not included with the new modified stamp image A1, one could not generate an authentic new stamp image A2 for a different collection. Instead, one would be working from the modified bits of A1, which are readily distinguishable electronically from A. This is more secure, because only those persons with access to the bits of an original image can generate new authenticated stamps of that sort. Note that in one embodiment this original image is not available from the collection of media objects.

Next, processing logic obtains a private key from a user (processing block 303). This may be inserted on a special paper sheet. The special paper sheet may be, for example, paper sheet described in U.S. patent application titled "Physical key for accessing a securely stored digital document" Ser. No. 10/639,282, filed Aug. 11, 2003 by Kurt Piersol and Gregory Wolff. In an alternate embodiment, the private key is stored in a document handling system, such as an MFP and is obtained by unlocking it by a passphrase at an operation panel of the system. In either case, both the private key and public key are obtained. Note that this operation is not necessary if encryption with the private key is not used later in the process.

Processing logic also obtains a unique identifier of the collection (processing block 304). In one embodiment, the unique identifier of the collection and the revision number are obtained using the DRI from the collection coversheet, which is described in more detail below. Note that this is not the DRI pointer, but an identifier contained within the collection. The pointer is used to retrieve this identifier from a server storing the collection. The revision number is obtained from the server as well.

Processing logic also obtains the date and time of the stamping event (i.e., the time when the process of adding the stamp is started) (processing block 305).

Using the checksum, processing logic creates a record that is to be integrated into the stamp image that is added to the collection (processing block 306). In one embodiment, the record is created by concatenating the digital checksum with one or more of a public key, the identifier for the collection, an identifier for a device creating the image, a creation date for the image, and a creation time for the stamp image, or information indicative of these items.

In one embodiment, the digital checksum of the stamp image is encrypted with the date and/or time values.

In another embodiment, additional data can be added to the record. For example, such information may include a computed total or database reference for the stamp image could be added to the record. These additions would be useful to allow later verifiers to see information in the stamp image without having to see the electronic collection original. For example, a "payment approved" stamp can include the total approved as part of its stamp image or a signed checksum of the entire contents of the collection at the time of the stamp was added is included in the record to serve as a digital signature of the collection.

In one embodiment, processing logic appends the record with a digital signature (processing block 307). In such a case, processing logic adds information corresponding to the record by inserting the record with the digital signature into the image. Note that the digital signature may be generated in a number of ways. In one embodiment, processing logic generates the digital signature by creating a hash (e.g., MD5 hash) of the record and encrypts the hash with a private key. Note that appending the record with a digital signature is optional.

Thereafter, processing logic digitally inserts the record into the stamp image (processing block 308). A number of well-known techniques may be used to digital insert the record into the stamp image including, but not limited to, digital watermarking techniques. Alternatively, microprinting techniques may be used.

Once digital is inserted into the stamp image, processing logic adds the stamp image to the collection (processing block 309). Once the stamp image has been added to the collection, processing logic constructs a collection overview that includes the stamp image (processing block 310).

In one embodiment, the record may be stored in metadata of an image. For example, the EXIF fields of a JPEG image may be used to store redundant copies of the record. There are many other image file formats that may be used with equivalent metadata fields. For example, the IPTC fields of Adobe Photoshop format, or the ImageDescription fields of TIFF documents. Thus, the record may be stored in these as well.

Verification Processing

The stamp image enables the document collection sheet to be authenticated. In other words, the information in the stamp image may be used to verify the authenticity of the collection representation.

Figure 4:
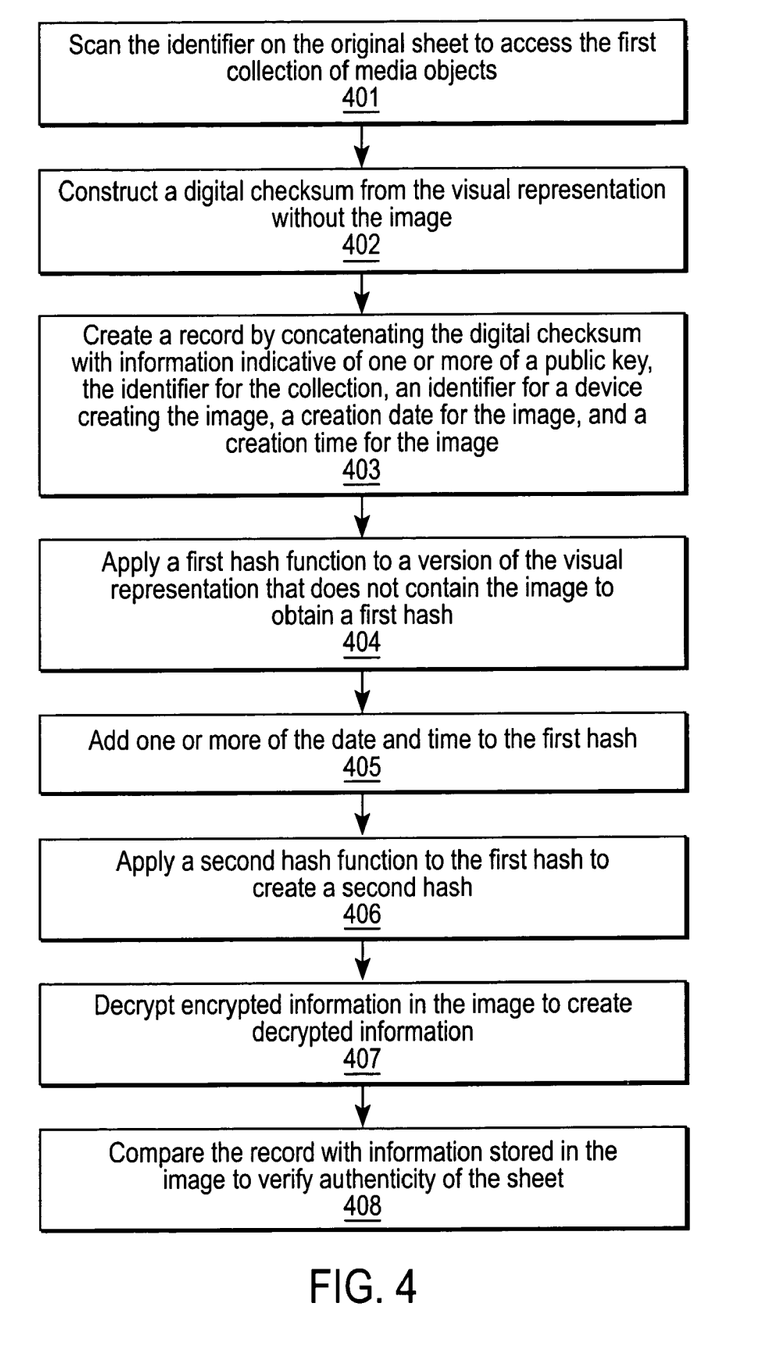
FIG. 4 illustrates one embodiment of a process for verifying the authenticity of a visual representation of a collection.

FIG. 4 illustrates one embodiment of a process for verifying the authenticity of a visual representation of a collection (e.g., a collection coversheet). The process is performed by processing logic that may comprise hardware (e.g., circuitry, dedicated logic, etc.), software (such as is run on a general purpose computer system or a dedicated machine), or a combination of both.

Referring to FIG. 4, the process begins by processing logic scanning the identifier on the original sheet to access the first collection of media objects (processing block 401). Note that scanning the identifier on the original sheet occurs after the original sheet has been identified as a sheet that represents a collection of media objects. This typically involves the use of sensing technology to review the scanned input sheets at predetermined locations for the identifier, and after locating an identifier in proper form at the predetermined locations, then concluding that the sheet represents a collection of media objects.

After accessing the first collection of media objects, processing logic constructs a digital checksum from the visual representation without the image (processing block 402).

Then, processing logic creates a record by concatenating the digital checksum with information indicative of one or more of a public key, the identifier for the collection, an identifier for a device creating the image, a creation date for the image, and a creation time for the image (processing block 403).

Processing logic applies a first hash function to a version of the visual representation that does not contain the image to obtain a first hash (processing block 404). In one embodiment, processing logic then adds one or more of the date and time to the first hash (processing block 405). In one embodiment, processing logic adds one or more of the date and time to the first hash by concatenating the one or more of the date and time to the first hash. In one embodiment, the time corresponds to a time at which the image is added to the collection.

In one embodiment, after applying the first hash function and adding one or more of the date and time to the first hash, processing logic applies a second hash function to the first hash to create a second hash (processing block 406). In one embodiment, the first and second hash functions may be the same or different and may comprise any well-known hash function, such as, but not limited to, the MD5 and a SHA-1 hash functions.

After applying any hash functions, in one embodiment, processing logic decrypts encrypted information in the image to create decrypted information (processing block 407). This could be used to obtain information in the encrypted record that isn't available from the image After decryption, processing logic compares the record with information stored in the image to verify authenticity of the sheet (processing block 408). That is, comparing the record after application of the second hash function (i.e., the second hash) to the decrypted information.

In this manner, processing logic verifies the authenticity of the visual representation (e.g., collection coversheet) based on a comparison of information incorporated into the image and information from scanned data related to the visual representation.

Figure 5:
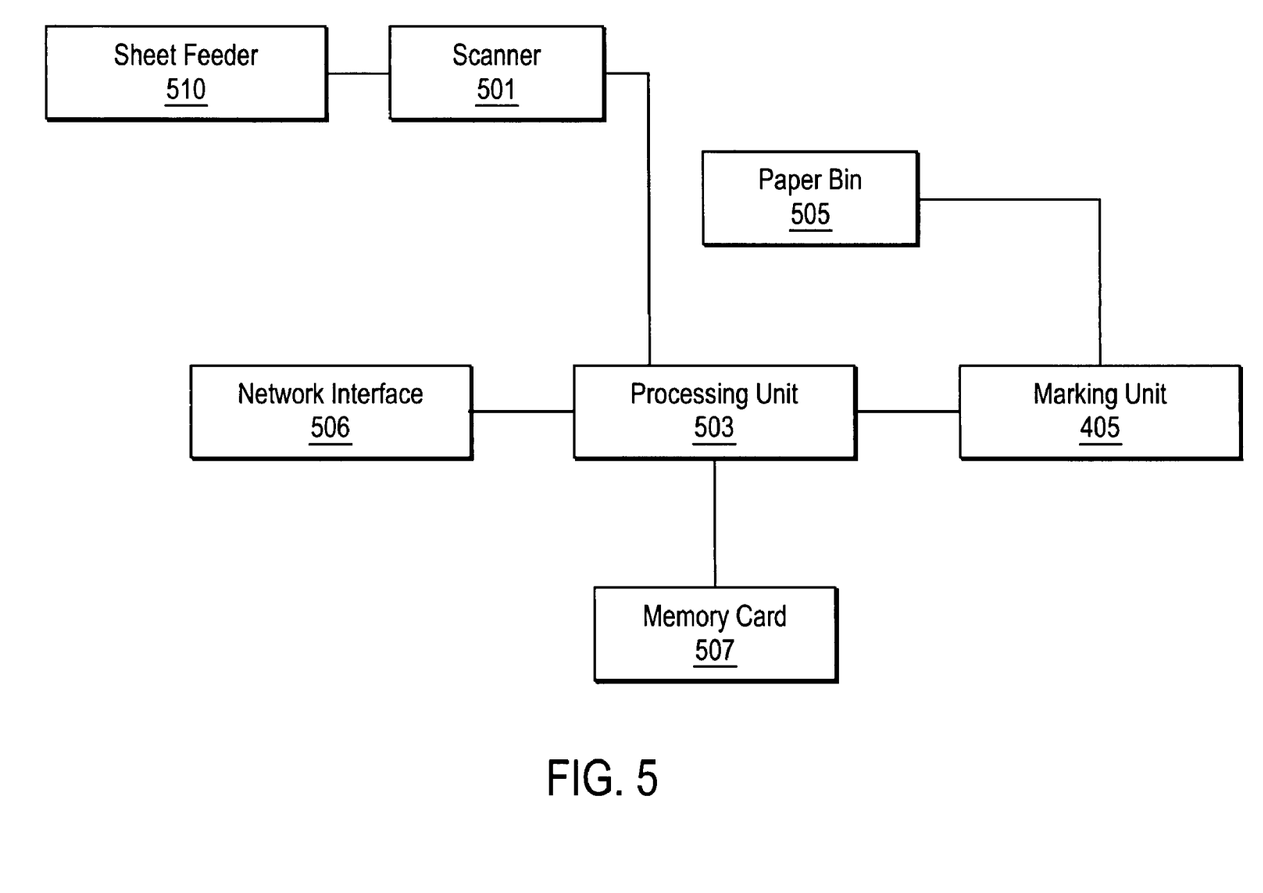
FIG. 5 is a block diagram of one embodiment of a system.

In one embodiment, the processing logic is implemented with a system, such as shown, for example, in FIG. 5. Referring to FIG. 5, system 500 comprises a scanner 501 to scan a sheet having the identifier printed on it and having a first collection of media objects represented by a graphic. Scanner 501 may also be used to scan in an image to be used as the stamp. Optionally, system 500 may include a sheet feeder 510 to supply the sheet to scanner 501.

System 500 also includes a processing unit 503 to modify a collection of media objects by adding one or more pages of the one or more other media objects to the collection of media objects to create a new collection of media objects, including creating and adding the stamp image to a collection of media objects. Marking unit 504 marks a sheet with a new identifier and new graphic representing the new collection of media objects. In one embodiment, a sheet feeder may feed marking unit 504 a new sheet upon which to print the new identifier and the new graphic in response to a request from processing unit 503.

As discussed herein, processing unit 503 may also cause the new graphic to be added to the original sheet such that the original graphic and the new graphic both appear on the sheet and together represent the new collection of media objects. In one embodiment, processing unit 503 is able to add the new graphic, such as the stamp image, to the sheet without obscuring the original graphic because processing unit 503 knows the location of the original graphic on the sheet. Processing unit 503 knows the location of the original graphic because the location of the original graphic is stored and accessed using the identifier that appears on the sheet. Processing unit 503 may know the location of the original graphic by looking in the scanned image. For instance, when adding media objects to a collection, processing unit 503 can just look for blank space in the scanned collection overview.

Note that in one embodiment, processing unit 503 and marking unit 504 may be combined into a marking engine.

The system may optionally include network interface 506 and memory card 507, both coupled to processing unit 503.

Figure 6:
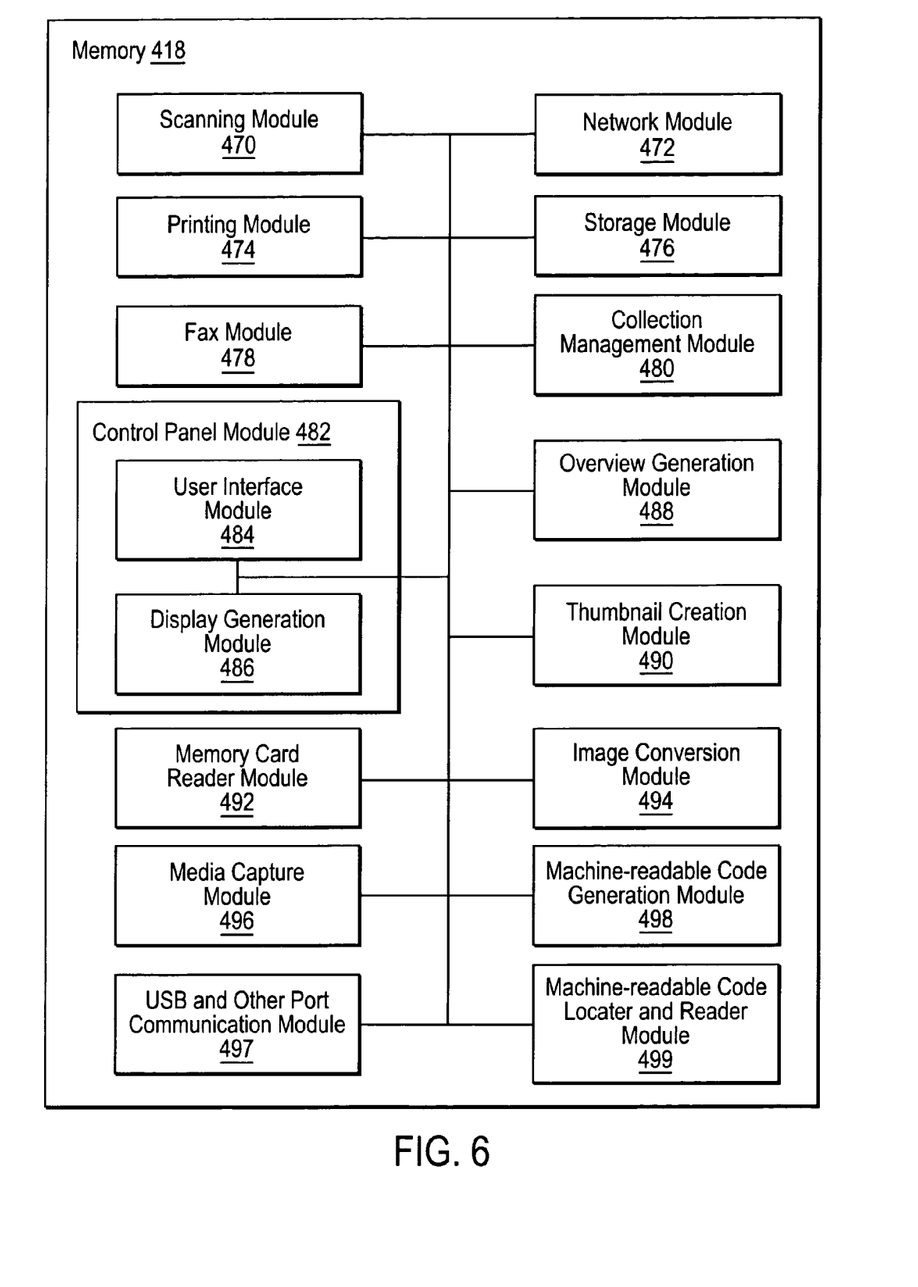
FIG. 6 illustrates an example of a typical MFP.

In one embodiment, the system of FIG. 5 is implemented as a multifunction peripheral (MFP). FIG. 6 is an illustrative example of a typical MFP. Referring to FIG. 6, the MFP is made up of various components, some of which are not required in the operation of each embodiment of the present invention. The MFP has a scanner 442 which can image pages of a document and in conjunction with the automatic document feeder 448 can image multiple pages rapidly. Images of pages can be stored in a non-volatile storage area 416, which might be a disk drive or in any other memory storage area like the memory 418. The MFP also contains a printer or marking mechanism 444, which can retrieve paper from the paper supply 446 and print images, which are stored in the memory 418, storage 416, obtained directly from the scanner 442, obtained from the processor 422 or from the network interface card 420, which can receive image print requests and images from the external network 450. Images to be printed can also come from the memory card reader 414, media capture devices 426 and 428 through a media capture port 454 or a USB or other port 452. Images can also be received or sent out through the fax interface 424.

The MFP can access other forms of media through electronic data input peripherals which may include magnetic readers for magnetic media such as floppy disks, magnetic tape, fixed hard disks, removable hard disks, memory cards, and so on. Peripherals may also include optical media readers for optical storage media such as CDs, DVDs, magneto-optical disks, and the like. Information obtained from these peripherals can be incorporated otherwise associated with scanned-in documents to enhance the document content.

Processing unit 503 controls the operation of the MFP components shown in FIG. 6. The control panel 446 having a display 476, a keypad 489 and indicator lights 451 can be used to instruct processing unit 503 to use the components of the MFP to make copies, scan documents or print faxes. MFPs are available from many companies, including Ricoh Company, Ltd. in Tokyo, Japan, which makes a programmable MFP called the Aficio 2035 S/P, which contains many of the components shown in FIG. 6. Such an MFP can be modified to include the marking engine and optional erasing engine described herein. Any suitably equipped MFP could be used in practicing this invention.

The memory 418 of the MFP contains modules that allow the operation of the MFP as well as the practice of the present invention.

Figure 7:
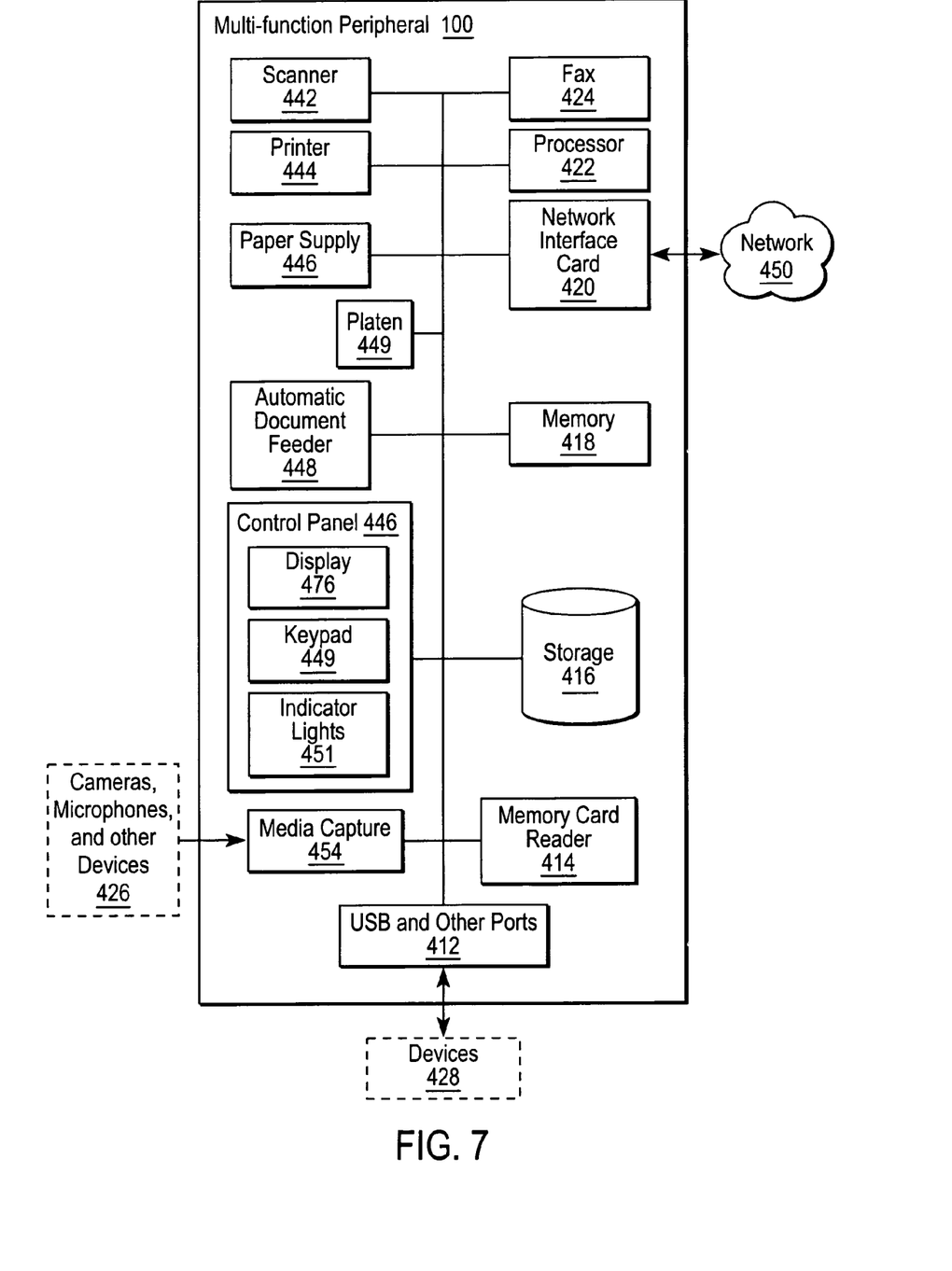
FIG. 7 is a high level representation of various program modules for operating an MFP.

FIG. 7 is a high level representation of various program modules resident in memory 418 for operating the MFP in accordance with the different aspects of the present invention. The scanning module 470 contains the instructions that processing unit 503 in combination with the scanner 442 can use to scan pages of documents. The printing module 474 contains control instructions for receiving an image or a description of an image and driving the marking unit 504 causing the image to be printed on a piece of paper. MFPs are known in the art and made by many different companies so a complete description of the operation of the MFP is not necessary. The fax 478, network 472, storage 476, image conversion 494, memory card reader 492, media capture 496, USB and other port 497 modules will not be described because their purpose and function is well understood.

A stamp image creation module 460 creates the stamp image. The stamp image creation module 460 performs the functions described above.

In addition to the typical MFP functions, the following modules are used for the operation of this invention. A collection management module 480 is available, which tells the processor how to communicate with the collection server and how to create and modify collections, including adding the stamp image into the collection.

A thumbnail creation module 490 can create thumbnail representations of media, including a smaller version of an image, a single-frame from a video or even a waveform from a stored audio signal. These thumbnails are used at least by the overview generation module 488, which is used to create an overview of a collection. The overview is described in detail later and the overview generation module puts together the thumbnails representing the documents and media into a single image that can be displayed or printed and used for accessing the documents and media.

The machine-readable code generation module 498 provides the MFP with the ability to create machine-readable codes like barcodes that represent specific collections. The machine-readable code locator/reader module can be used to find and decode machine-readable codes on collection coversheets in order to determine which coversheet was scanned by the scanning mechanism 442. Preferably, machine-readable codes are barcodes, though there are many ways of creating machine-readable indicia. Barcodes are robust and take up little space and are easily decoded using standard hardware and software. One company that sells software for locating and decoding a variety of barcodes is Tasman Software of Leeds, United Kingdom. Software for creating and printing barcodes can be purchased from IDAutomation.com, Inc. of Tampa, Fla. Decoding machine-readable codes is well known in the industry.

The control panel is controlled by the processor 422 using information from the user interface module 484 and the display generation module 486, which are part of the control panel module 482.

There are a number of advantages to embodiments of the present invention. In one embodiment, stamp images remain easily readable, while being verifiable. Also, the stamp image is inextricably marked in a way that is difficult to forge. The stamp itself can be extremely difficult to forge.

In one embodiment, the stamp is stored electronically in the collection. This is beneficial in that degraded copies can be replaced simply by reprinting the collection from the electronic form. Note that this also means that the stamp image cannot be reused in another collection without detection.

Also beneficial is the fact that the stamp image may be verified optically or electronically. Watermarking allows the combined verification record to be recovered directly from the coversheet. In one embodiment, all information necessary to verify the image is available in the clear, either from the watermark or from metadata. Thus, verification can occur without the need for network access to access the collection and can occur with, for example, a portable scanner or PDA.

Coversheets

A collection coversheet is a sheet of paper that represents a collection and, in one embodiment, comprises a header, a string of text printed in a machine-readable format, a collection overview image, optionally, an area in which notes may be written, and optionally a human-readable version of the text encoded in the machine-readable code.

As discussed above, FIG. 2 illustrates an exemplary cover sheet representing a collection of information. The header contains printed information about the collection. This information may include the author of the collection, a list of zero, one or more people who will be notified if the collection is modified, time and date information about when the collection was last modified or when this coversheet was printed out, and an optional collection topic or subject.

In one embodiment, the machine-readable code contains an encoded version of a unique pointer to the collection on the collection server. In one embodiment, this same pointer when presented in the human-readable form is similar to a uniform resource locator or URL used in the World Wide Web and is referred to herein as a collection identifier, distributed resource identifier, or DRI. In one embodiment, a collection server uses these DRIs as unique collection pointers. In one embodiment, DRIs are globally unique, difficult to guess, and can provide access to collections from anywhere on the Internet.

Within this specification, the terms "collection identifier," "distributed resource identifier," and "DRI" will be used interchangeably and should be understood to mean the same thing—a unique identifier that points to a collection of media and documents stored on a collection server. Also, the identifier might be written in human-readable form or machine-readable form. Both printed forms represent the same identifier and point to the same collection even though they look unlike each other.

In one embodiment, the DRI used for a collection points to a directory that contains the collection of documents as well as information used to build the collection overview and some additional metadata. DRIs can also point directly to an individual file the same way that a URL can point to either a directory or a file.

Since a collection typically comprises a multitude of documents, the DRI is often a directory reference rather than a reference to a particular file. For example, in an OS (operating system) such as Unix, the DRI can be a directory reference such as /usr/collection. Alternatively, the DRI can refer to a file that in turn leads to an identification of the constituent elements of a collection. In still another alternative, the DRI can be a reference to a database that stores the collection.

The text of the DRI 510 may comprise a string of characters that includes a random text component. This randomly (and thus, unguessable) generated text serves to prevent access to a collection because it is virtually impossible to guess.

The example DRI "/root/usr/collection" assumes a single-machine architecture. In a more generalized configuration of two or more machines, the DRI can include a machine name component. For example, a more accessible format such as the URL (universal resource locator) format for identifying World Wide Web (WWW) pages might be suitable. In one embodiment, the DRI constitutes the path portion of the URL. Purely by convention, the path portion uses the following naming format according to a particular embodiment of this aspect of the present invention:

. . . /-DDS-/ORIGIN/ . . . , where DDS is the name of a particular repository of collections, and ORIGIN is the fully qualified hostname of the original server for the collection identified by the DRI.

Thus, for example, a collection may be identified by the following URL:

http://machine 1.com/-msg-/machine2.com/2002/1022/298hy9y8h8#$30er#/1/

The IP address of the machine is identified by "machine 1.com." The path portion refers to a collection stored in a repository named "-msg-." The original copy of the collection (i.e., its place of creation) is located on a machine named "machine2.com." Thus, in this case, "machine1" contains a copy of the collection. In one embodiment, collections are contained in directories, though other data storage conventions can be used; e.g., collections can be stored and managed in a database. The collection shown in the example above is stored in a directory called:

"/2002/1022/298hy9y8h8#$30er#/1/."

The pathname portion "/2002/1022" represents a date; e.g., date of creation of the collection. The string "398hy9y8h8#$30er#" represents randomly generated text.

Finally, as will be discussed below, the directory represented by the terminal pathname "/1/" refers to the first (initial, original, base, etc.) version of the collection.

In one embodiment, both the host machine ("machine 1") and the original machine ("machine2") use the following directory structure and URL naming structure. The host machine has a directory called "-msg-" contained in its respective "root" directory for storing collections. The "-msg-" directory has a sub-directory called "machine2.com" which contains all the collections originating on "machine2.com." Generally, a sub-directory is provided for each machine that can be an originator of a collection.

Given the DRI, a person or machine will have enough information to access the collection in order to add to or modify the collection.

Using a 2-D bar code representation of a DRI allows for automated access to the collection without requiring the user to manually enter the location. It can be appreciated of course that any machine-readable indicium can be used instead of a bar code system, including optical character recognition (OCR) of the human-readable DRI.

Using the MFP and/or the processing logic and the techniques described herein, it is possible to create and modify collections on a collection server, including adding a stamp image to a collection. A new, empty collection can be created. A new non-empty collection can be created using available documents and media. Electronic media and paper documents can be added to existing collections. A collection can be printed. Collections can be added to or merged. Also, actions can be taken on individual media in a collection using notes or actions selected on the coversheet.

In one embodiment, scalable vector graphics files or SVG files are used to represent the collection overview. SVG files are a standard way of creating a visual representation on the World Wide Web and there are many viewers and tools for creating SVG. A collection preferably includes a specially name SVG file which can be used to construct an overview image for the coversheet or any display. In one embodiment, the SVG file includes information for displaying the thumbnails of individual documents and media stored in the collection.

Metadata about the individual files in the collection and their relationship to other files in the collection is stored preferably in an XML (extensible markup language) file. In one embodiment, this information includes image width and height, links between images and their thumbnails and links between a document and an image representing that document. The exact format is unimportant as long as the collection server understands how to read and write the format.

Additional information related to the collection as a whole can also be stored in the metadata file. This information might include the time at which the message was created, the subject of the message, the name of the author of the collection, and contact information such as email addresses, fax numbers, etc. belonging to those who should be notified when a collection is altered.

While creating a new collection, either a printout is generated or the information about the new collection, including at least the DRI is emailed or faxed to someone. Otherwise, the DRI will be lost to all but the collection server and will not be available for adding documents because no one will have or be able to guess the DRI.

The MFP contacts the collection server through a network to request a new collection identifier or DRI. It should be understood that it is possible for the MFP to request identifiers in advance so that if the collection server is busy or temporarily offline, the MFP can still create new collections.

If the coversheet is to be printed, then the MFP composes a coversheet. In one embodiment, a header block is created including at least the date and time of the creation of the new collection. The DRI or identifier obtained from the collection server is added to the coversheet at the bottom in human-readable form and then encoded in an industry standard two-dimensional PDF417 type barcode in one embodiment and added to the upper right-hand corner of the coversheet. An SVG representing the overview is converted to image form and added to the appropriate place in the coversheet. Additional information might also be added as deemed appropriate. The composition of the coversheet described here is one possibility but anyone skilled in the art will recognize that there are many ways to lay out or compose a coversheet that are within the scope of this invention.

The task of adding to an existing collection requires a collection to exist. In one embodiment, to add to that collection at the MFP, the user uses a coversheet from the existing collection. As mentioned, each collection identifier represents a single collection but collections can change over time. In one embodiment, each time a collection changes, the last path element in the DRI is modified. Those who have access to a single collection are thereby easily given access to all versions of that collection. In one embodiment, the version name or final pathname of /0/ has a special significance and means the "latest" or "most recently created" version.

In one embodiment, pathname /1/ indicates the first version of the collection, /2/ represents the second version, etc. When a new collection is uploaded to the collection server, a new directory using the next integer is created. The next collection after /2/ would preferably be called /3/. In order to maintain unique version numbers, it is essential that only one device, i.e., the collection server, create the version number of final pathname. The version number cannot be created by the MFP because multiple MFPs might generate a number at the same time and choose the same name. Instead, the MFPs create a collection and upload it to a temporary directory on the collection server and when everything is uploaded, the collection server moves it into place and assigns the final pathname.

If the user has additional paper documents, they can be placed on an automatic document feeder. If the user has images or other documents in a memory card or some other media, the media can be placed in the appropriate reader.

If the user wishes to create some electronic media at the time of the creation of the new collection, the user records audio, video, still images, or other electronic media using any of the microphone, a digital camera, video camera, or other media-capturing device may be used.

Each DRI is associated with the page of the document or image in which it was found. However, the MFP can recognize that a page containing a DRI represents a collection. Putting a page with a DRI into any collection, new or existing, could be understood as a request to add that collection to the new collection. In other words, the page containing the DRI represents a request to add the collection pointed to by that DRI to the new collection. The overview image of that collection will be retrieved and added as a thumbnail to the new collection and the subject of that collection will be used as the title for the thumbnail.

Because this is a new collection, one or more new identification numbers are requested and received from the collection server. In one embodiment, only a single collection identifier is needed for a new collection.

Each document or page that was found to contain a DRI in machine-readable form is replaced with an image representing the collection pointed to by that DRI.

In one embodiment, a thumbnail is created for each page or document or other media. The thumbnail is preferably a smaller version of the page that is similar in appearance but smaller in storage size and in number of pixels. With recorded audio, a thumbnail is just a representation of the audio and could be a waveform or even a standard computer icon representing the audio. In the preferred embodiment, the audio could be displayed as a rectangle containing a waveform whose shape is based on the audio content and whose length corresponds to the duration of the audio recording. A video thumbnail could be a single frame or a small number of representative frames from the video composited into a single small image. Those who are skilled in the art will understand that there are many various ways of creating thumbnails to represent media. Each collection coversheet was replaced with a collection overview image that is now reduced to form a thumbnail.

All of the media and documents for the new collection are now added to the collection, which means that they are uploaded to the collection server and placed in the directory pointed to by the DRI of the new collection. There are many well-known protocols for uploading files to a server, including FTP, SCP, HTTP PUT. Preferably, the HTTP PUT protocol is used which allows the MFP to specify the location and contents of each media file as it is being uploaded.

The thumbnails representing the new media items are arranged in the collection overview. The thumbnails are placed in an appropriate manner within the overview, expanding the overview size if necessary.

The SVG file representing the overview is written and uploaded to the collection server and all of the thumbnails are uploaded.

One method for placing thumbnails is to find a place in the overview image where the thumbnail can be positioned where it will not overlap any other thumbnail. An exhaustive search—moving the thumbnail to different positions within the overview and looking for overlaps with other thumbnails—is too slow. Another approach is to reduce the problem to that of placing a single point. This can be done by reducing the size of the overview by the width and height of the thumbnail to be placed and enlarging the existing thumbnails by the same dimensions. The origin of the new thumbnail can be placed anywhere within the remaining space in the overview without overlapping existing thumbnails. This is known as a "configuration space" approach because instead of finding a new thumbnail location in the original two dimensional space of the overview, a new "available-space" region is calculated in which the origin of the thumbnail is placed instead of the entire thumbnail. Configuration space techniques for interference checking are well known in the field of robotics and path planning.

The size of the thumbnail to be added to the overview is determined. Thumbnail sizes are usually measured in pixels. Often thumbnails are chosen to be some standard size—chosen so that they neither the width nor height is larger than a certain maximum size—perhaps 150 pixels for standard display resolutions or two inches for printed thumbnails. Since some images might have a very large or very small aspect ratio. It might be more appropriate to limit the thumbnail to a maximum area—square pixels or square inches—rather than a maximum width and height.

Scaling an image so that it contains no more than some total number of pixels instead of restricting the width and height to be less than some maximum improves the overall appearance of the thumbnails and is the preferred method of selecting a thumbnail size. However, any method for choosing thumbnail sizes can be used for the present invention.

In one embodiment, a single bounding box for all the thumbnails previously placed on the overview is calculated and the origin of the new thumbnail is placed outside of that bounding box. It is also possible and understood by extension that instead of calculating just a single bounding box, an individual bounding box for each thumbnail may be calculated and extended so that the new thumbnail can be placed in any available position in the overview. This is well understood by those experienced with path planning algorithms and would be analogous to allowing a machine to travel between obstacles instead of requiring the robot to go around all the obstacles.

Adding a second new thumbnail now to the overview could be accomplished. However, instead of adding one bounding box to cover all the thumbnails, simply adding a single box representative of the newly added thumbnail is the preferred approach. This box is calculated to be the size of the newly added thumbnail and then is extended up and to the left by the width and height of the thumbnail to be added, just like the first bounding box.

All new thumbnails are uploaded to the collection server as well as the new overview description file and metadata file.

Modifying the overview could be accomplished using an object-based drawing tool like those available in Microsoft's PowerPoint software or Adobe Illustrator or similar tools. These tools and techniques are well understood by those skilled in the art.

All modified information is sent to the collection server, including the metadata files, SVG overview file, and any changes in the collection.

The user may bring media to the MFP or creates it using media recording devices or the like connected to the MFP or to the network.

The advantage of having a machine-readable collection identifier on a coversheet is that the MFP or any device that can locate and decode machine-readable codes can determine which collection is represented by the coversheet. The user can indicate which collection the new media will be added to by typing in a collection identifier or DRI but this can be a difficult task because DRIs tend to be long random strings of characters. DRI's can be located and decoded from a scanned image or read using handheld barcode scanners if they are encoded in barcode format. Handheld scanners which read many different types of one and two-dimensional barcodes are available from many companies like Hewlett-Packard Company of Palo Alto, Calif., USA. They can also be read in text form using optical character recognition technology or decoded from a magnetic strip if properly encoded. If a coversheet of the collection is available, the coversheet should be placed on the MFP where it can be scanned, either in the automatic document feeder or directly on the glass platen. Alternatively, the barcode can be scanned using a handheld scanner. If the barcode has been captured in a digital image, perhaps using a digital camera, the camera can be directly connected to the MFP or a memory card from the camera can be plugged into a card reader. There are many other methods for presenting the MFP with a machine-readable DRI and those methods and techniques are not enumerated herein because they are understood by those skilled in the art.

In one embodiment, a machine-readable DRI is presented as part of the coversheet of the collection. In one embodiment, the DRI is contained in PDF417 format two-dimensional barcode on the coversheet and the coversheet is placed on an automatic document feeder (ADF) of the MFP. Additional documents or pages to be added to the collection are placed behind the coversheet. The additional pages can be any document pages or they can be coversheets of other messages.

Each of the documents and media is searched for a machine-readable DRI. When a bar-coded DRI is scanned using a handheld scanner, the DRI can be stored in the memory of the MFP so that it can be accessed when it is time to determine which collection to add the new media to. If the ADF or a platen has been used to scan in a coversheet or if the DRI is contained in an image from the digital camera, the DRI will have to be read from the scanned r captured image. Either source of a DRI is acceptable and typically, if there is no DRI held in a memory due to hand scanning of a coversheet, the first scanned sheet or first image will contain the DRI. Those skilled in the art will recognize that there are many ways of providing the DRI to the MFP an exhaustive list need not be provided.

The entire image media including images that are scans of document pages is searched for machine-readable codes. Typically, when adding a page or document to a collection, the image of that page is added to the collection storage area and a thumbnail is added to the overview. If that page happens to contain a machine-readable DRI then based on the users preference, instead of adding the page to the collection, the collection that the DRI represents can be added to the collection. For each page or image containing a DRI, the "page add" request is converted into a "collection add" request with the appropriate DRI representing the collection.

Thumbnails are created for all of the new images, documents, pages, and media. For those pages that represent other collections, thumbnails are made for the collections instead of the page. All collected media is uploaded to the collection server.

It is important that the existing collection be changed in a way that makes the current state or version of the collection available at a later time. The new media should not be placed in the same storage area as the existing collection.

Typically, new media and thumbnails in a collection are uploaded to a staging area on the collection server. The staging area is associated with the collection identifier but doesn't have a permanent final pathname. As soon as all of the information has been uploaded and is complete, the collection server moves the collection into a final directory or storage area with a permanent final pathname. The permanent final pathname is usually the next integer after the most recently uploaded collection.

The thumbnails representing the new media are added to the collection overview.

The thumbnails, metadata, and the overview SVG file, are uploaded to the staging area in the collection server. All changes and modifications are finally uploaded to the collection server and at this point, the server has everything required to move the collection out of the staging area and into the final directory upon assigning a version number.

A collection server can keep a mapping of collection identifiers to collection directories.

An Exemplary Computer System

Figure 8:
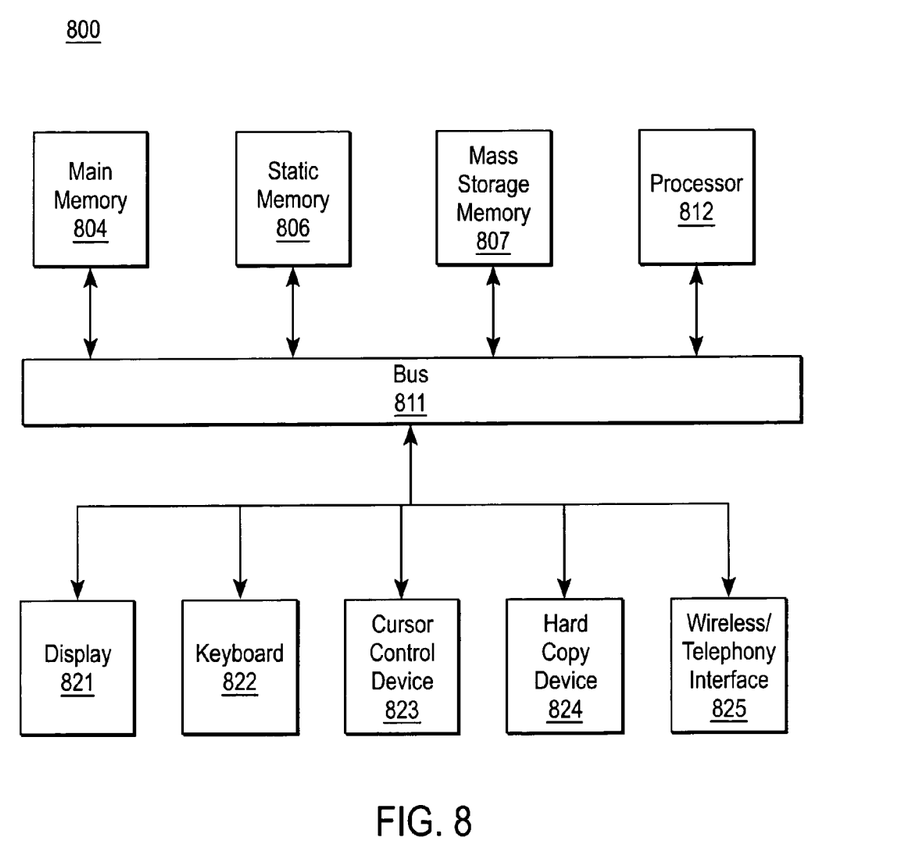
FIG. 8 is a block diagram of an exemplary computer system.

FIG. 8 is a block diagram of an exemplary computer system that may perform one or more of the operations described herein. Referring to FIG. 8, computer system 800 may comprise an exemplary client or server computer system. Computer system 800 comprises a communication mechanism or bus 811 for communicating information, and a processor 812 coupled with bus 811 for processing information. Processor 812 includes a microprocessor, but is not limited to a microprocessor, such as, for example, Pentium™, PowerPC™, Alpha™, etc.

System 800 further comprises a random access memory (RAM), or other dynamic storage device 804 (referred to as main memory) coupled to bus 811 for storing information and instructions to be executed by processor 812. Main memory 804 also may be used for storing temporary variables or other intermediate information during execution of instructions by processor 812.

Computer system 800 also comprises a read only memory (ROM) and/or other static storage device 806 coupled to bus 811 for storing static information and instructions for processor 812, and a data storage device 807, such as a magnetic disk or optical disk and its corresponding disk drive. Data storage device 807 is coupled to bus 811 for storing information and instructions.

Computer system 800 may further be coupled to a display device 821, such as a cathode ray tube (CRT) or liquid crystal display (LCD), coupled to bus 811 for displaying information to a computer user. An alphanumeric input device 822, including alphanumeric and other keys, may also be coupled to bus 811 for communicating information and command selections to processor 812. An additional user input device is cursor control 823, such as a mouse, trackball, trackpad, stylus, or cursor direction keys, coupled to bus 811 for communicating direction information and command selections to processor 812, and for controlling cursor movement on display 821.

Another device that may be coupled to bus 811 is hard copy device 824, which may be used for marking information on a medium such as paper, film, or similar types of media. Another device that may be coupled to bus 811 is a wired/wireless communication capability 825 to communication to a phone or handheld palm device.

Note that any or all of the components of system 800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in themselves recite only those features regarded as essential to the invention.

We claim:

1. A method comprising:
    integrating verification information, with a processor, into a stamp image, the verification information to enable verification of a visual representation of a collection of media objects on which the stamp image is applied, wherein the stamp image is entangled with the collection by inclusion of a hash of data extracted from the collection in the stamp image, the stamp image entangled with the collection to enable verification of the collection of media objects without access to the collection of media objects;
    adding the stamp image to a collection of media objects; and
    producing the visual representation of the collection that includes the stamp image, the visual representation having an identifier to identify the collection and graphical content providing a visual representation of content for each of the media objects.

2. The method defined in claim 1 further comprising verifying authenticity of the visual representation by optically scanning the stamp image.

3. The method defined in claim 1 wherein the stamp image is a graphic containing information relating to media objects.

4. The method defined in claim 3 wherein the information comprises a word.

5. The method defined in claim 1 wherein the visual representation comprises a sheet of paper.

6. The method defined in claim 1 wherein the stamp image is added to the visual representation in a known location.

7. The method defined in claim 5 wherein producing the visual representation comprises printing the sheet.

8. The method defined in claim 1 wherein the stamp image is visually related to the collection and is readable by an automated mechanism.

9. The method defined in claim 1 wherein the verification information includes at least one of a group consisting of an indication of the individual that caused the stamp image to be inserted into the collection, a time indication, and a collection identifier.

10. The method defined in claim 1 wherein bits of the stamp image are linked to authentication information to authenticate the visual representation.

11. The method defined in claim 1 further comprising:
    constructing a digital checksum from a visual representation of the collection without the stamp image.

12. The method defined in claim 11 further comprising:
    creating a record by concatenating the digital checksum with information indicative of one or more of a public key, the identifier for the collection, an identifier for a device creating the stamp image, a creation date for the stamp image, and a creation time for the stamp image; and
    adding information corresponding to the record to the stamp image.

13. The method defined in claim 12 further comprising appending the record with a digital signature, and wherein adding information corresponding to the record comprises inserting the record with the digital signature into the stamp image.

14. The method defined in claim 12 further comprising generating the digital signature by creating a hash of the record and encrypting the hash with a private key.

15. The method defined in claim 11 wherein constructing a digital checksum from the stamp image comprises:
    applying a first hash function to a version of the visual representation that does not contain the stamp image to obtain a first hash.

16. The method defined in claim 15 further comprising:
    adding one or more of the date and time to the first hash; and
    applying a second hash function to the first hash to create a second hash.

17. The method defined in claim 16 wherein adding one or more of the date and time to the first hash comprises concatenating the one or more of the date and time to the first hash.

18. The method defined in claim 17 wherein the time corresponds to a time at which the stamp image is added to the collection.

19. The method defined in claim 15 wherein the hash function comprises one selected from a group consisting of an MD5 hash function and a SHA-1 hash function.

20. The method defined in claim 1 wherein the stamp image is entangled with the collection of media objects by inclusion of data extracted from the collection of media objects in the verification information.

21. The method of claim 20, wherein the data extracted from the collection of media objects is the result of a hash applied to content of the collection of media objects.

22. A non-transitory computer-readable medium storing instructions thereon which, when executed by a system, cause the system to perform a method comprising:
  integrating verification information into a stamp image, the verification information to enable verification of a visual representation of a collection of media objects on which the stamp image is applied, wherein the stamp image is entangled with the collection by inclusion of a hash of data extracted from the collection in the stamp image, the stamp image entangled with the collection to enable verification of the collection of media objects without access to the collection of media objects;
  adding the stamp image to a collection of media objects; and
  producing the visual representation of the collection that includes the stamp image, the visual representation having an identifier to identify the collection and graphical content providing a visual representation of content for each of the media objects.

23. The computer-readable medium defined in claim 22 wherein the stamp image is entangled with the collection.

24. The computer-readable medium defined in claim 22 wherein the stamp image is a graphic containing information relating to media objects.

25. The computer-readable medium defined in claim 22 wherein the visual representation comprises a sheet of paper, and wherein producing the visual representation comprises printing the sheet.

26. The computer-readable medium defined in claim 22 wherein the stamp image is visually related to the collection and is readable on the visual representation by an automated mechanism.

27. The computer-readable medium defined in claim 22 wherein the method further comprises verifying authenticity of the visual representation by optically scanning the stamp image.

28. The computer-readable medium defined in claim 22 wherein the verification information includes at least one of a group consisting of an indication of the individual that caused the image to be inserted into the collection, a time indication, and a collection identifier.

29. The computer-readable medium defined in claim 22 wherein bits of the stamp image are linked to authentication information to authenticate the visual representation.

30. The computer-readable medium defined in claim 22 wherein the method further comprises: constructing a digital checksum from a visual representation of the collection without the stamp image.

31. The computer-readable medium defined in claim 30 wherein the method further comprises:
  creating a record by concatenating the digital checksum with information indicative of one or more of a public key, the identifier for the collection, an identifier for a device creating the stamp image, a creation date for the stamp image, and a creation time for the stamp image; and
  adding information corresponding to the record to the stamp image.

32. The computer-readable medium defined in claim 31 wherein the method further comprises appending the record with a digital signature, and wherein adding information corresponding to the record comprises inserting the record with the digital signature into the stamp image.

33. The computer-readable medium defined in claim 31 wherein the method further comprises generating the digital signature by creating a hash of the record and encrypting the hash with a private key.

34. The computer-readable medium defined in claim 30 wherein constructing a digital checksum from the image comprises: applying a first hash function to a version of the visual representation that does not contain the stamp image to obtain a first hash.

35. The computer-readable medium defined in claim 34 wherein the method further comprises:
  adding one or more of the date and time to the first hash; and
  applying a second hash function to the first hash to create a second hash.

36. The computer-readable medium defined in claim 35 wherein adding one or more of the date and time to the first hash comprises concatenating the one or more of the date and time to the first hash.

37. The computer-readable medium defined in claim 36 wherein the time corresponds to a time at which the stamp image is added to the collection.

38. The computer-readable medium defined in claim 34 wherein the hash function comprises one selected from a group consisting of an MD5 hash function and a SHA-1 hash function.

39. An apparatus comprising:
  a processing unit to integrate verification information into a stamp image, the verification information to enable verification of a visual representation of a collection of media objects on which the stamp image is applied, and to add the stamp image to a collection of media objects, wherein the stamp image is entangled with the collection by inclusion of a hash of data extracted from the collection in the stamp image, the stamp image entangled with the collection to enable verification of the collection of media objects without access to the collection of media objects; and
  a printer coupled to the processing unit to print the visual representation of the collection that includes the image, the visual representation having an identifier to identify the collection and graphical content providing a visual representation of content for each of the media objects.

40. An apparatus comprising:
  means for integrating verification information into a stamp image, the verification information to enable verification of a visual representation of a collection of media objects on which the stamp image is applied, wherein the stamp image is entangled with the collection by inclusion of a hash of data extracted from the collection in the stamp image, the stamp image entangled with the collection to enable verification of the collection of media objects without access to the collection of media objects;
  means for adding the stamp image to a collection of media objects; and
  means for producing the visual representation of the collection that includes the image, the visual representation having an identifier to identify the collection and graphical content providing a visual representation of content for each of the media objects.

41. A method comprising:
  preparing a stamp image, with a processor, that is entangled with a collection of media objects, wherein verification information is integrated into the stamp image, the verification information to enable verification of a sheet displaying an overview of the collection on which the stamp image is applied, wherein the stamp image is entangled with the collection by inclusion of a hash of data extracted from the collection in the stamp image, the stamp image entangled with the collection to enable verification of the collection of media objects without access to the collection of media objects;

adding the stamp image to the collection; and generating a sheet displaying an overview of the collection and the stamp image, the overview providing a visual representation of content for each of the media objects.

42. The method defined in claim 41 wherein the stamp image is displayed on the sheet is in a format suitable for optical or electronic verification.

43. The method defined in claim 41 wherein the stamp image includes at least one of a group consisting of an indication of the individual that caused the image to be inserted into the collection, a time indication, and a collection identifier.

44. A non-transitory computer-readable medium storing instructions thereon which, when executed by a system, cause the system to perform a method comprising:

preparing a stamp image that is entangled with a collection of media objects, wherein verification information is integrated into the stamp image, the verification information to enable verification of a sheet displaying an overview of the collection on which the stamp image is applied, wherein the stamp image is entangled with the collection by inclusion of a hash of data extracted from the collection in the stamp image, the stamp image entangled with the collection to enable verification of the collection of media objects without access to the collection of media objects;

adding the stamp image to the collection; and generating a sheet displaying an overview of the collection and the stamp image, the overview providing a visual representation of content for each of the media objects.

45. An apparatus comprising:

means for preparing a stamp image that is entangled with a collection of media objects, wherein verification information is integrated into the stamp image, the verification information to enable verification of a sheet displaying an overview of the collection on which the stamp image is applied, wherein the stamp image is entangled with the collection by inclusion of a hash of data extracted from the collection in the stamp image, the stamp image entangled with the collection to enable verification of the collection of media objects without access to the collection of media objects;

means for adding the stamp image to the collection; and means for generating a sheet displaying an overview of the collection and the stamp image, the overview providing a visual representation of content for each of the media objects.

* * * * *